(12) United States Patent  
Yasuda

(10) Patent No.: US 10,530,489 B2  
(45) Date of Patent: Jan. 7, 2020

(54) OPTICAL SIGNAL RECEPTION APPARATUS, OPTICAL COMMUNICATION SYSTEM, AND METHOD OF GENERATING COMPENSATION SIGNAL OF OPTICAL SIGNAL RECEPTION APPARATUS

(71) Applicant: NEC CORPORATION, Tokyo (JP)

(72) Inventor: Wakako Yasuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/089,180

(22) PCT Filed: Feb. 27, 2017

(86) PCT No.: PCT/JP2017/007398  
§ 371 (c)(1),  
(2) Date: Sep. 27, 2018

(87) PCT Pub. No.: WO2017/169424  
PCT Pub. Date: Oct. 5, 2017

(65) Prior Publication Data  
US 2019/0115983 A1    Apr. 18, 2019

(30) Foreign Application Priority Data

Mar. 30, 2016    (JP) .................................. 2016-068282

(51) Int. Cl.  
*H04B 10/60*    (2013.01)  
*H04B 10/61*    (2013.01)  
(Continued)

(52) U.S. Cl.  
CPC ......... *H04B 10/612* (2013.01); *H04B 10/614* (2013.01); *H04B 10/6164* (2013.01);  
(Continued)

(58) Field of Classification Search  
CPC ......................................... H04B 10/616–6166  
See application file for complete search history.

(56) References Cited

U.S. PATENT DOCUMENTS

2014/0029938 A1*  1/2014  Nakashima .......... G01M 11/336  
398/28  
2014/0286638 A1*  9/2014  Yasuda ................ H04B 10/614  
398/65

FOREIGN PATENT DOCUMENTS

WO    2013/051289 A1    4/2013

OTHER PUBLICATIONS

Andreas Leve, et al., "Frequency Estimation in Intradyne Reception", IEE Photonics Technology Letters, Mar. 15, 2007, pp. 366-368, vol. 19, No. 6.

(Continued)

*Primary Examiner* — Shi K Li  
(74) *Attorney, Agent, or Firm* — Sughrue Mion, PLLC

(57) ABSTRACT

A frequency difference compensation unit (510) generates a carrier recovery signal by compensating for a frequency difference between a local light beam and an optical signal in a plurality of digital signals. A first symbol determination unit (521) determines the symbol position of the carrier recovery signal in which a frequency difference is compensated for, in accordance with the signal arrangement of multi-value modulation. A second symbol determination unit (522) determines the symbol position of the carrier recovery signal in which a frequency difference is compensated for, in accordance with a signal arrangement in which the number of multi-values of the multi-value modulation is reduced. A loop filter unit (540) and a compensation signal generation unit (550) temporarily generates a compensation signal using a determination result of the second symbol determination unit (522), and then regularly generates the compensation signal using a determination result of the first symbol determination unit (521).

9 Claims, 11 Drawing Sheets

(51) Int. Cl.
  *H04L 27/22* (2006.01)
  *H04J 14/06* (2006.01)
  *H04L 27/38* (2006.01)
(52) U.S. Cl.
  CPC ..... *H04B 10/6165* (2013.01); *H04B 10/6166* (2013.01); *H04J 14/06* (2013.01); *H04L 27/22* (2013.01); *H04L 27/3818* (2013.01)

(56) References Cited

OTHER PUBLICATIONS

Kang Ping Zhong, et al., "Linewidth-Tolerant and Low-Complexity Two-Stage Carrier Phase Estimation Based on Modified QPSK Partitioning for Dual-Polarization 16-QAM Systems", Journal of Lightwave Technology, Jan. 1, 2013, pp. 50-57, vol. 31, No. 1.
Syed Muhammad Bilal, et al., "Multistage Carrier Phase Estimation Algorithms for Phase Noise Mitigation in 64-Quadrature Amplitude Modulation Optical Systems", Journal of Lightwave Technology, Sep. 1, 2014, pp. 2973-2980, vol. 32, No. 17.
International Search Report for PCT/JP2017/007398 dated May 16, 2017 [PCT/ISA/210].

* cited by examiner

OPTICAL SIGNAL RECEPTION APPARATUS, OPTICAL COMMUNICATION SYSTEM, AND METHOD OF GENERATING COMPENSATION SIGNAL OF OPTICAL SIGNAL RECEPTION APPARATUS

CROSS REFERENCE TO RELATED APPLICATIONS

This application is a National Stage of International Application No. PCT/JP2017/007398, filed on Feb. 27, 2017, which claims priority from Japanese Patent Application No. 2016-068282, filed on Mar. 30, 2016, the contents of all of which are incorporated herein by reference in their entirety.

TECHNICAL FIELD

The present invention relates to an optical signal reception apparatus, an optical communication system, and a method of generating a compensation signal of an optical signal reception apparatus.

BACKGROUND ART

With the spread of the Internet, communication has become a part of community infrastructure. The amount of data per user increases year after year, and network traffic also continues to increase. As an optical fiber transmission channel that takes charge of backbone communication among network infrastructures, an optical transmission system having a capacity per channel of 100 Gb/s is put into practice use. Then, in the future, an increase in the capacity of a transmission channel based on a system of 400 Gb/s or a system of 1 Tb/s is required.

There is multi-valuing of a signal, as one of techniques for realizing an increase in the capacity of a transmission channel. Among multi-value modulation techniques, a 16-quadrature amplitude modulation (QAM) signal has already been put into practice use. Practice use of an ultrahigh multi-value modulation signal such as a 32-QAM signal or a 64-QAM signal is essential in order to realize 1 Tb/s.

A QAM signal on which multi-value modulation is performed in a transmitter is received and demodulated in a digital coherent receiver. The digital coherent receiver includes a local light source and a carrier recovery unit. The carrier recovery unit estimates and compensates for a frequency error occurring when the received QAM signal and continuous wave (CW) light, which is output from the local light source, interfere with each other at an optical front end. There are a feed forward type and a decision feedback type in a system in which the frequency error is estimated. An example of a frequency error estimation system of the feed forward type is disclosed in Non-Patent Document 1. However, in this system, a corresponding modulation system is limited to QPSK. Complicated signal processing is required for application to a higher-order modulation system. Consequently, in a multi-value modulation signal equal to or more than 16-QAM, the decision feedback type is often used.

RELATED DOCUMENT

Non-Patent Document

[Non-Patent Document 1] Andreas Leven et. al, "Frequency Estimation in Intradyne Reception", PTL, vol. 19, no. 6, pp 366, 2007

SUMMARY OF THE INVENTION

Technical Problem

In a case where a frequency error estimation system of a decision feedback type is used, it is not possible to estimate a frequency error insofar as a feedback loop does not converge. In a case of a QPSK signal, its frequency pull-in range is large. Therefore, the feedback loop converges even in a case where a frequency error is great. However, in a case of a 16-QAM signal, its frequency pull-in range is smaller than in the QPSK signal. Therefore, the feedback loop does not converge in a case where a frequency error is great. For this reason, it is necessary to cause the feedback loop to converge using a training signal. In a case of an ultrahigh multi-value modulation signal such as a 32-QAM or 64-QAM signal, its frequency pull-in range becomes much smaller than in the 16-QAM signal. Therefore, in a case where a slight frequency error is present, the feedback loop does not converge, and it is not possible to estimate a frequency error.

An object of the present invention is to cause a feedback loop of frequency error estimation to converge even in a case where a training signal is not used in a signal processing system in which a frequency pull-in range is small.

Solution to Problem

According to the present invention, there is provided an optical signal reception apparatus including: an optical front end that generates a plurality of output light beams by causing an optical signal on which polarization multiplexing and multi-value modulation are performed and a local light beam to interfere with each other; a signal conversion unit that generates a plurality of digital signals by photoelectrically converting and further analog-digital converting each of the plurality of output light beams; a frequency difference compensation unit that generates a carrier recovery signal by compensating for a frequency difference between the local light beam and the optical signal with respect to the plurality of digital signals; a first symbol determination unit that determines a symbol position of the carrier recovery signal in accordance with a signal arrangement of the multi-value modulation; a second symbol determination unit that determines the symbol position of the carrier recovery signal in accordance with a signal arrangement in which the number of multi-values of the multi-value modulation is reduced; and a compensation signal generation unit that generates a compensation signal in the frequency difference compensation unit, wherein the compensation signal generation unit temporarily generates the compensation signal using a determination result of the second symbol determination unit, and then regularly generates the compensation signal using a determination result of the first symbol determination unit.

According to the present invention, there is provided an optical communication system including: an optical signal transmission apparatus that transmits an optical signal on which polarization multiplexing and multi-value modulation are performed; and an optical signal reception apparatus that processes the optical signal, wherein the optical signal reception apparatus includes an optical front end that generates a plurality of output light beams by causing the optical signal and a local light beam to interfere with each other, a signal conversion unit that generates a plurality of digital signals by photoelectrically converting and further analog-digital converting each of the plurality of output light beams, a frequency difference compensation unit that generates a carrier recovery signal by compensating for a frequency difference between the local light beam and the optical signal with respect to the plurality of digital signals, a first symbol determination unit that determines a symbol position of the carrier recovery signal in accordance with a signal arrangement of the multi-value modulation, a second symbol determination unit that determines the symbol position of the carrier recovery signal in accordance with a signal arrangement in which the number of multi-values of the multi-value modulation is reduced, and a compensation signal generation unit that generates a compensation signal in the frequency difference compensation unit, and the compensation signal generation unit temporarily generates the compensation signal using a determination result of the second symbol determination unit, and then regularly generates the compensation signal using a determination result of the first symbol determination unit.

According to the present invention, there is provided a method of generating a compensation signal of an optical signal reception apparatus in a frequency difference compensation unit, the optical signal reception apparatus including: an optical front end that generates a plurality of output light beams by causing an optical signal on which polarization multiplexing and multi-value modulation are performed and a local light beam to interfere with each other; a signal conversion unit that generates a plurality of digital signals by photoelectrically converting and further analog-digital converting each of the plurality of output light beams; a frequency difference compensation unit that generates a carrier recovery signal by compensating for a frequency difference between the local light beam and the optical signal with respect to the plurality of digital signals; a first symbol determination unit that determines a symbol position of the carrier recovery signal in accordance with a signal arrangement of the multi-value modulation; and a second symbol determination unit that determines the symbol position of the carrier recovery signal in accordance with a signal arrangement in which the number of multi-values of the multi-value modulation is reduced, wherein the method includes temporarily generating the compensation signal using a determination result of the second symbol determination unit, and then regularly generating the compensation signal using a determination result of the first symbol determination unit.

Advantageous Effects of Invention

According to the invention, it is possible to cause a feedback loop of frequency error estimation to converge even in a case where a training signal is not used in a signal processing system in which a frequency pull-in range is small.

BRIEF DESCRIPTION OF THE DRAWINGS

The above and other objects, features and advantages will be made clearer from certain preferred example embodiments described below, and the following accompanying drawings.

DESCRIPTION OF EMBODIMENTS

Figure 1:
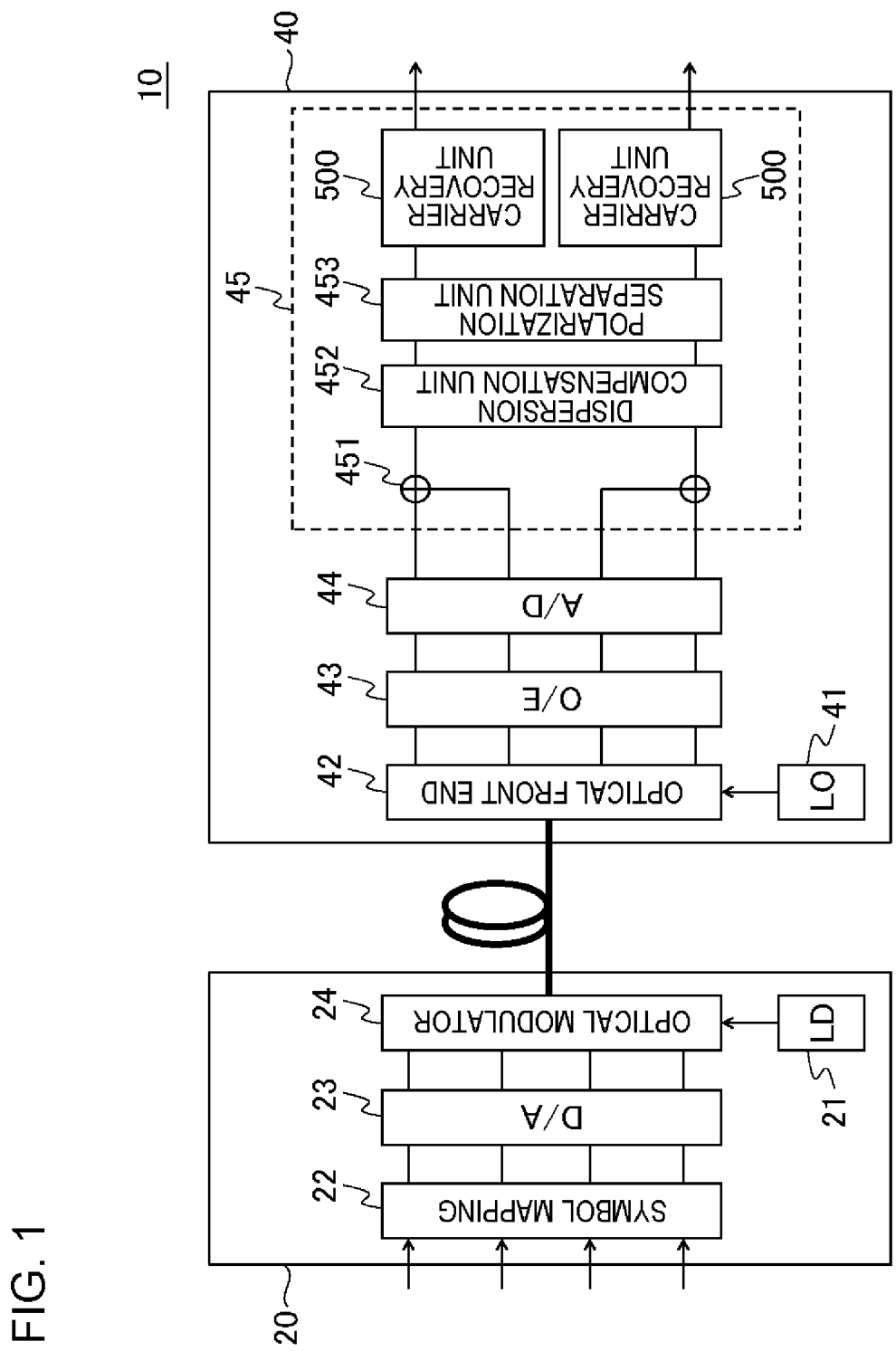
FIG. 1 is a block diagram illustrating a configuration of an optical communication system according to a first example embodiment.

Hereinafter, example embodiments of the present invention will be described with reference to the accompanying drawings. In all the drawings, like elements are referenced by like reference numerals and the descriptions thereof will not be repeated.

First Example Embodiment

Figure 11:
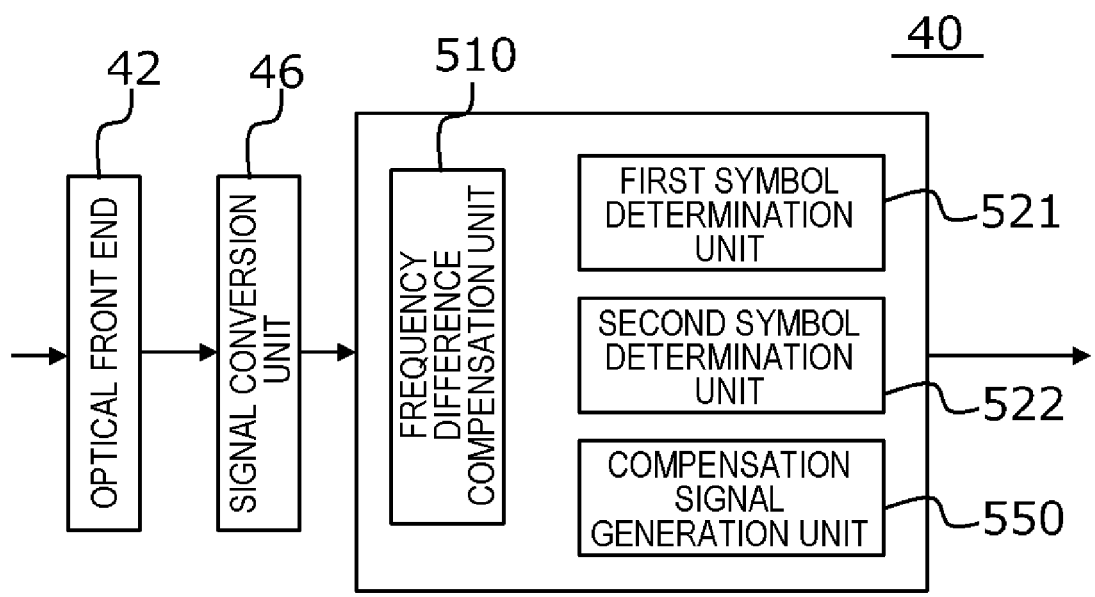
FIG. 11 is a block diagram illustrating an example of a configuration of an optical signal reception apparatus according to the first example embodiment.

FIG. 11 is a diagram illustrating an example of a configuration of an optical signal reception apparatus 40 according to the present example embodiment. The optical signal reception apparatus 40 according to the present example embodiment includes an optical front end 42, an optical signal conversion unit 46, a frequency difference compensation unit 510, a first symbol determination unit 521, a second symbol determination unit 522, and a compensation signal generation unit 550.

The optical front end 42 generates a plurality of output light beams by causing an optical signal on which polarization multiplexing and multi-value modulation are performed and a local light beam to interfere with each other. The optical signal conversion unit 46 generates a plurality of digital signals by photoelectrically converting and further analog-digital converting each of the plurality of output light beams generated by the optical front end 42. The frequency difference compensation unit 510 generates a carrier recovery signal by compensating for a frequency difference between the local light beam and the optical signal with respect to the plurality of digital signals generated by the optical signal conversion unit 46.

The first symbol determination unit 521 determines the symbol position of the carrier recovery signal in accordance with the signal arrangement of the multi-value modulation stated above. The second symbol determination unit 522 determines the symbol position of the carrier recovery signal in accordance with a signal arrangement in which the number of multi-values of the multi-value modulation is reduced. The compensation signal generation unit 550 generates a compensation signal in the frequency difference compensation unit 510.

The compensation signal generation unit 550 temporarily generates the compensation signal using the determination result of the second symbol determination unit 522, and then regularly generates the compensation signal using the determination result of the first symbol determination unit 521. As described above, the second symbol determination unit 522 determines the symbol position of the carrier recovery signal in accordance with the signal arrangement in which the number of multi-values of the multi-value modulation is reduced. Therefore, the compensation signal generated by the compensation signal generation unit 550 is likely to converge than in a case where the second symbol determination unit 522 is not used. Hereinafter, a detailed description will be given.

FIG. 1 is a block diagram illustrating an example of a configuration of an optical communication system 10 in which the optical signal reception apparatus 40 is used. The optical communication system 10 includes an optical signal transmission apparatus 20 and an optical transmission line 30, in addition to the optical signal reception apparatus 40. The optical communication system 10 according to the present example embodiment is a system in which communication is performed using a signal having a smaller frequency pull-in range of a carrier recovery unit 500 than a QPSK signal, specifically, a QAM signal, for example, a signal having a signal arrangement equal to or more than 16-QAM.

The optical signal transmission apparatus 20 includes a light source 21, a symbol mapping 22, a digital/analog conversion unit 23, and an optical modulator 24. The light source 21 is, for example, a laser oscillator, and oscillates a laser light beam serving as a carrier wave. The symbol mapping 22 replaces an input binary signal by the signal arrangement of a QAM signal. The digital/analog conversion unit 23 converts a digital signal which is output from the symbol mapping 22 into an analog signal. The optical modulator 24 generates an optical signal by modulating the laser light beam which is output by the light source 21 using the analog signal which is output by the digital/analog conversion unit 23. This optical signal is, for example, the aforementioned QAM signal. Hereinafter, the optical signal will be described as the QAM signal.

The optical signal reception apparatus 40 includes a local light source 41, the optical front end 42, a photoelectric conversion unit 43, an analog/digital conversion unit (A/D) 44, and a signal processing apparatus 45. The signal processing apparatus 45 is constituted by a complex signal generation unit 451, a dispersion compensation unit 452, a polarization separation unit 453, and the carrier recovery unit 500. Note that the photoelectric conversion unit 43 and the analog/digital conversion unit 44 are an example of the optical signal conversion unit 46 in FIG. 11.

The local light source 41 is, for example, a laser oscillator, and oscillates a local light beam. The local light beam has the same frequency as that of the light source 21 of the optical signal transmission apparatus 20. However, there are errors in the frequency of this local light beam and the frequency of light emitted by the light source 21.

The optical front end 42 causes the received QAM signal to interfere with the local light beam which is output from the local light source 41, and outputs a four-component optical signal based on an orthogonal polarization and an orthogonal phase. The photoelectric conversion unit 43 converts each of four optical signals which are output by the optical front end 42 into electrical signals (analog signals), and outputs the converted signals. The A/D conversion unit 44 converts each of four analog signals which are output by the photoelectric conversion unit 43 into digital signals, and outputs the converted signals.

The signal processing apparatus 45 is, for example, one or a plurality of integrated circuits (LSI), and outputs a demodulated signal by performing various types of signal processing on a four-component digital signal which is output by the analog/digital conversion unit 44. The signal processing apparatus 45 includes the complex signal generation unit 451, the dispersion compensation unit 452, the polarization separation unit 453, and the carrier recovery unit 500. The complex signal generation unit 451 generates and outputs a two-component complex signal for each polarization from the four-component digital signal. The dispersion compensation unit 452 equalizes a complex signal, and compensates for waveform distortion due to wavelength dispersion occurred in the optical transmission line 30 by the QAM signal. The polarization separation unit 453 adaptively equalizes the complex signal, and outputs an equalized signal by separation for each orthogonal polarization component.

The carrier recovery unit 500 compensates for a light source frequency error between the QAM signal and the local light beam and outputs a carrier recovery signal.

Figure 2:
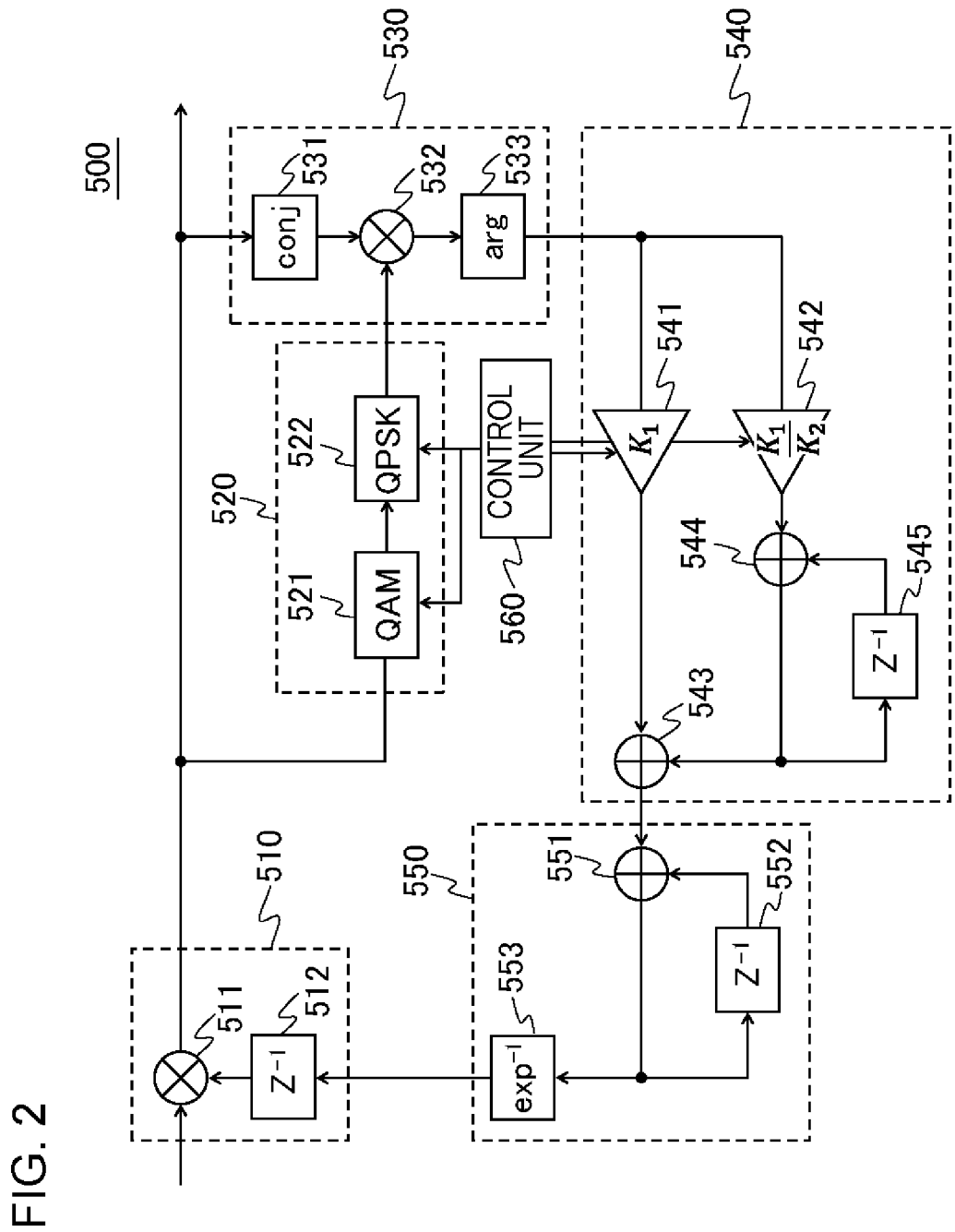
FIG. 2 is a diagram illustrating an example of a detailed functional configuration of a carrier recovery unit.

FIG. 2 is a diagram illustrating an example of a detailed functional configuration of the carrier recovery unit 500. The carrier recovery unit 500 includes the frequency difference compensation unit 510, a symbol determination unit 520, an error calculation unit 530, a loop filter unit 540, and the compensation signal generation unit 550.

The frequency difference compensation unit 510 generates a carrier recovery signal by compensating for a frequency difference between a local light beam and an optical signal regarding a plurality of digital signals. The symbol determination unit 520 includes the first symbol determination unit 521 and the second symbol determination unit 522. The first symbol determination unit 521 determines the symbol position of the carrier recovery signal in which a frequency difference is compensated for, in accordance with the signal arrangement of the multi-value modulation. The second symbol determination unit 522 determines the symbol position of the carrier recovery signal in which a frequency difference is compensated for, in accordance with a signal arrangement in which the number of multi-values of the multi-value modulation is reduced. The loop filter unit 540 and the compensation signal generation unit 550 generates a compensation signal which is used by the frequency difference compensation unit 510. Specifically, the loop filter unit 540 and the compensation signal generation unit 550 temporarily generates the compensation signal using the determination result of the second symbol determination unit 522, and then regularly generates the compensation signal using the determination result of the first symbol determination unit 521. Hereinafter, the carrier recovery unit 500 will be described in detail.

The frequency difference compensation unit 510 includes a multiplier 511 and a delay device 512. The multiplier 511 multiplies an equalized signal $e(t_n)$ including a light source frequency error w by a corrected signal $c(t_{n-1})$ output from the delay device 512, and outputs a carrier recovery signal $e'(t_n)$. Note that the equalized signal $e(t_n)$ is represented by the following Expression (1), and that the carrier recovery signal $e'(t_n)$ is represented by the following Expression (2).

$$e(t_n)=r(t_n)\exp[j\omega t_n+\phi(t_n)] \qquad (1)$$

$$e'(t_n)=e(t_n)c(t_{n-1}) \qquad (2)$$

The symbol determination unit 520 includes the first symbol determination unit 521 and the second symbol determination unit 522. The first symbol determination unit 521 determines the symbol position of the carrier recovery signal on the basis of the number of multi-values of the QAM signal. In other words, the first symbol determination unit 521 determines the carrier recovery signal in accordance with the logic of the QAM signal. On the other hand, the second symbol determination unit 522 determines the symbol position of the carrier recovery signal in accordance with a signal arrangement (in other words, signal arrangement in which the number of symbols is reduced) in which the number of symbols is made smaller than the number of multi-values of the QAM signal. For example, in a case where the QAM signal is a 64-QAM signal, the first symbol determination unit 521 handles the carrier recovery signal as a 64-QAM signal. On the other hand, the second symbol determination unit 522 performs the determination of the symbol position on the assumption that the carrier recovery signal is a 16-QAM signal or a QPSK signal.

Figure 3:
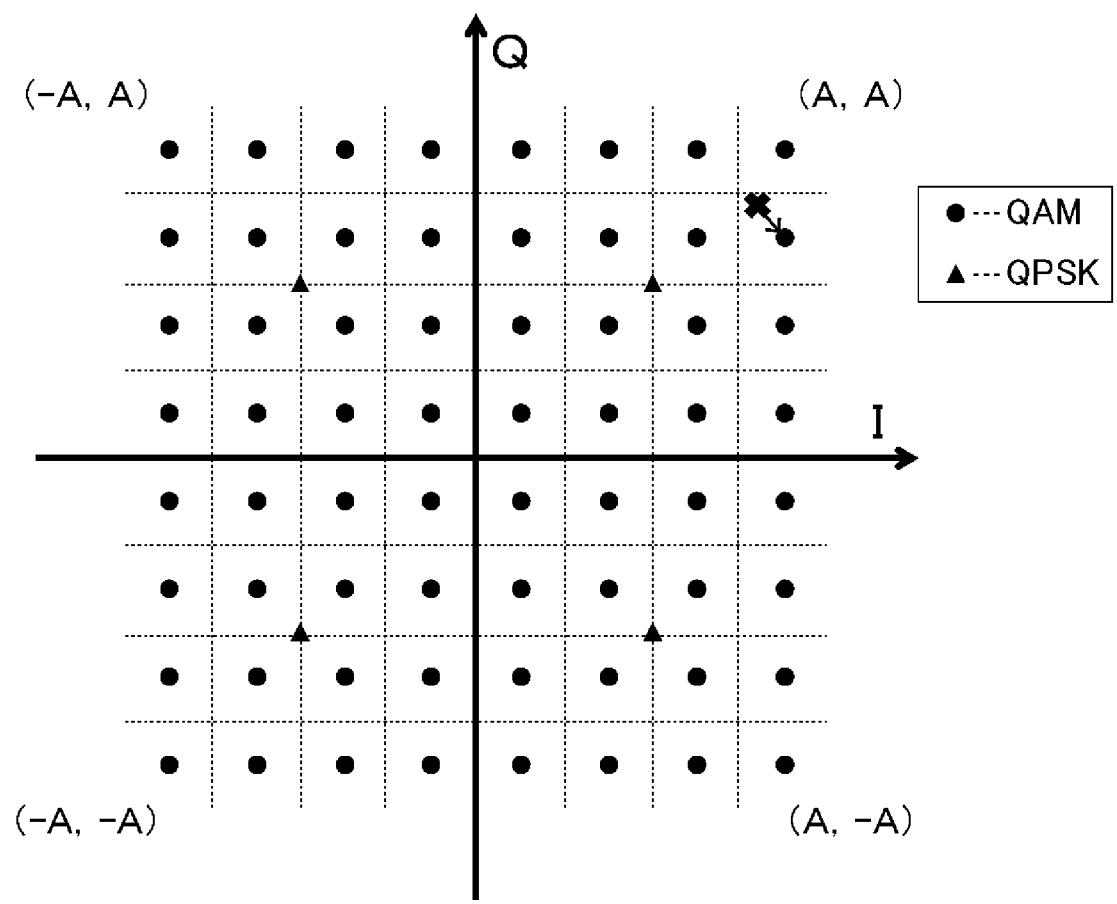
FIG. 3 is a diagram illustrating an example of an operation of a QAM determination unit.

The operation of the first symbol determination unit 521 will be described with reference to FIG. 3, for example, with respect to a case where the QAM signal is a 64-QAM signal. A carrier recovery signal $e(t_n)$ input to the first symbol determination unit 521 is denoted by a mark × on a plane IQ. The first symbol determination unit 521 determines the symbol position of the QAM signal closest to the carrier recovery signal $e'(t_n)$ using thresholds $I=I_{th}$ and $Q=Q_{th}$ as a boundary, and outputs a determination signal $d^{QAM}$. Note that the thresholds $I_{th}$ and $Q_{th}$ are represented by the following Expression (3). In addition, the determination signal $d^{QAM}$ is represented by the following Expression (4), and is any one of 64 symbols denoted by marks ○ in FIG. 3. The second symbol determination unit 522 will be described later.

$$I = \pm \frac{2}{7}A, \pm \frac{4}{7}A, \pm \frac{6}{7}A, \quad Q = \pm \frac{2}{7}A, \pm \frac{4}{7}A, \pm \frac{6}{7}A \quad (3)$$

$$d^{QAM} = \frac{2m-1}{7}A + j\frac{2n-1}{7}A (m = -3\sim4, n = -3\sim4) \quad (4)$$

The error calculation unit 530 includes a complex conjugate calculator 531, a multiplier 532, and a deviation angle calculator 533. The complex conjugate calculator 531 calculates and outputs a complex conjugate $d^*(t_n)$ of a determination signal $d(t_n)$. The multiplier 532 multiplies the carrier recovery signal $e'(t_n)$ by the complex conjugate $d^*(t_n)$ of the determination signal, and outputs an error between the carrier recovery signal and the determination signal. This output is represented by a complex number. The deviation angle calculator 533 calculates the angle of deviation from an error represented by a complex number, and outputs this angle of deviation as a phase error $\theta_{err}(t_n)$.

The loop filter unit 540 includes amplifiers 541 and 542, adders 543 and 544, and a delay device 545. The loop filter unit 540 has a configuration according to a transfer function LF(Z) of Expression (5), estimates a frequency error $\omega_e$ by averaging the phase error $\theta_{err}(t_n)$, and outputs $\omega_e\Delta t$.

$$LF(Z) = K_1\left(1 + \frac{1}{K_2}\frac{1}{1-Z^{-1}}\right) \quad (5)$$

In a case of a signal (for example, QPSK signal) having a small number of symbols, the allowable range of the phase error $\theta_{err}(t_n)$ is large. Therefore, $K_1$ and $1/K_2$ can be set to be large, and as a result, the allowable range of the frequency error $\omega_e$ becomes larger. On the other hand, the allowable range of the phase error $\theta_{err}(t_n)$ becomes smaller as the number of symbols increases. Therefore, in a case of a signal (for example, QAM signal) having a large number of symbols, $K_1$ and $1/K_2$ are required to be set to be small, and the allowable range of the frequency error $\omega_e$ becomes smaller. Generally, a magnitude relation between the respective signals of $K_1$ and $K_2$ is represented by Expression (6).

$$K_1^{QPSK} > K_1^{QAM}, 1/K_2^{QPSK} > 1/K_2^{QAM} \quad (6)$$

The compensation signal generation unit 550 includes an adder 551, a delay device 552, and a complex calculator 553. The adder 551 and the delay device 552 integrate the output $\omega_e\Delta t$ of the loop filter unit, and outputs the integrated value as an estimated phase $\omega_e t_n$. The complex calculator 553 calculates and outputs a corrected signal $c_z(t_n)$ from the estimated phase $\omega_e t_n$. Note that the corrected signal $c_z(t_n)$ is represented by the following Expression (7).

$$c_z(t_n) = \exp[-j\omega_e t_n] \quad (7)$$

The output of the compensation signal generation unit 550 is input to the frequency difference compensation unit 510. In this manner, the carrier recovery unit 500 has a feedback loop. In a case where this feedback loop converges, the frequency error $\omega_e$ substantially coincident with a light source frequency error w between the QAM signal and the local light beam, and as a result, the frequency difference compensation unit 510 can output a carrier recovery signal in which a difference between the frequencies of the light source 21 and the local light source 41 is accurately compensated for.

Thereafter, the operation of the optical communication system 10 is started.

The initial values of the delay devices 512, 545, and 552 are required in order for the carrier recovery unit 500 to start an initial calculation. In a case of the QPSK signal having a small number of symbols, the allowable range of the frequency error $\omega_e$ is large, and thus the feedback loop easily converges with initial values which are approximately calculated. However, as the number of symbols of the QAM signal increases, the allowable range of the frequency error $\omega_e$ becomes smaller. Therefore, in a case where the initial value of the delay device 545 is not appropriately set in accordance with the magnitude of an allowed frequency error, the feedback loop does not converge.

Consequently, in a case of a 64-QAM signal or 32-QAM signal, the delay device 545 is required to be induced to have an appropriate value in accordance with the amount of the light source frequency error so that the feedback loop converges even in a case where calculation is started from any initial value.

Consequently, the carrier recovery unit 500 according to the present example embodiment includes a control unit 560 to control the delay device 545. The control unit 560 is connected to the first symbol determination unit 521, the second symbol determination unit 522, and the amplifiers 541 and 542. The control unit 560 controls the first symbol determination unit 521, the second symbol determination unit 522, and the amplifiers 541 and 542 in accordance with a sequence shown in FIG. 4, and induces the delay device 545 to have an appropriate value according to the amount of the light source frequency error.

Figure 4:
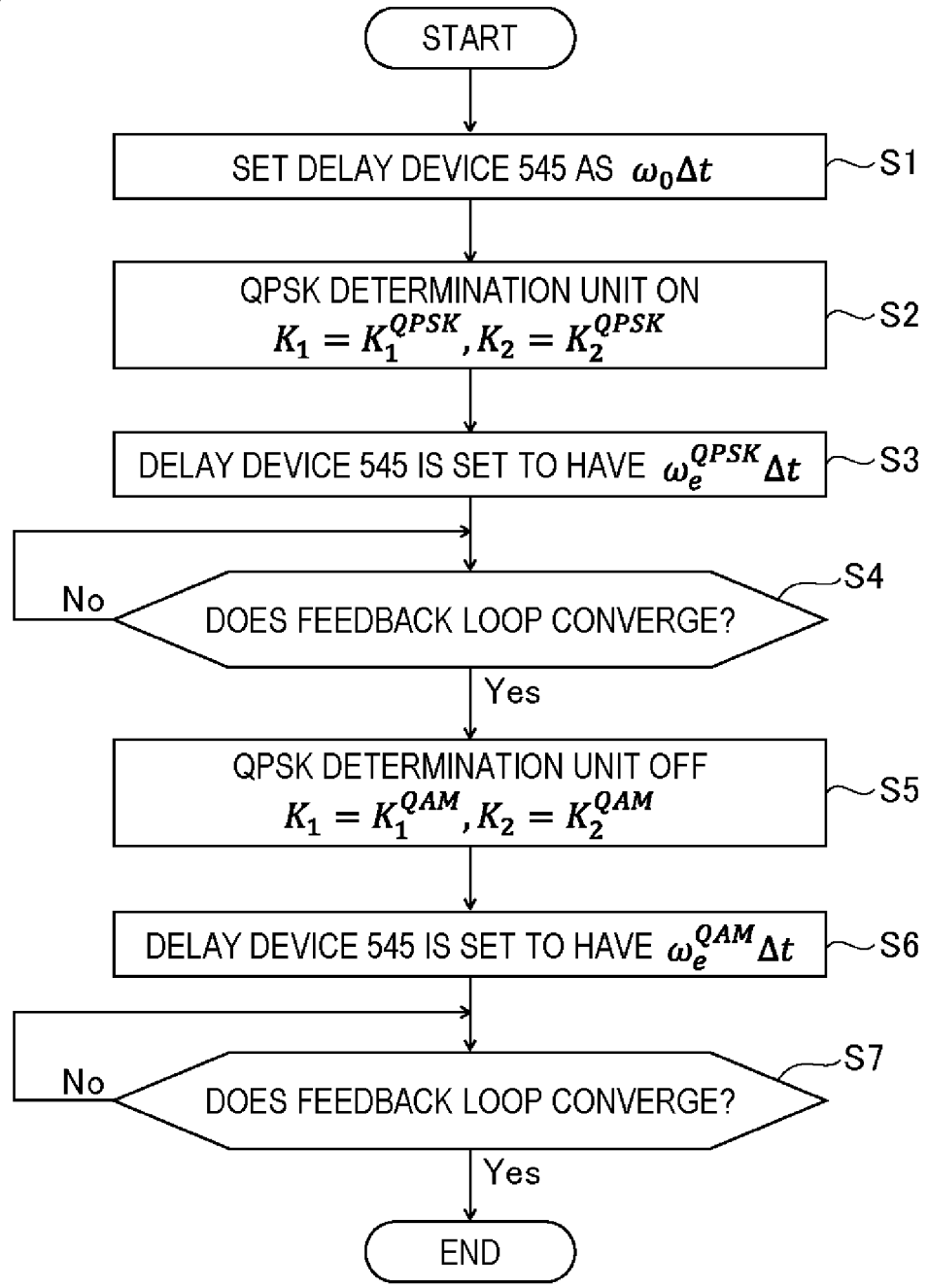
FIG. 4 is a diagram illustrating an example of control performed by a control unit.

In the process shown in FIG. 4, first, any initial value $\omega_0\Delta t$ is set in advance in the delay device 545 (step S1). The control unit 560 sets the second symbol determination unit 522 to be in an ON-state, and sets the coefficients $K_1$ and $K_2$ of the amplifiers 541 and 542. The control unit 560 sets the coefficients $K_1$ and $K_2$ of the amplifiers 541 and 542 in accordance with the following Expression (8) (step S2).

$$K_1 = K_1^{QPSK}, K_2 = K_2^{QPSK} \qquad (8)$$

In this case, the first symbol determination unit 521 may be in an ON-state as it is, and may enter an OFF-state.

Figure 5:
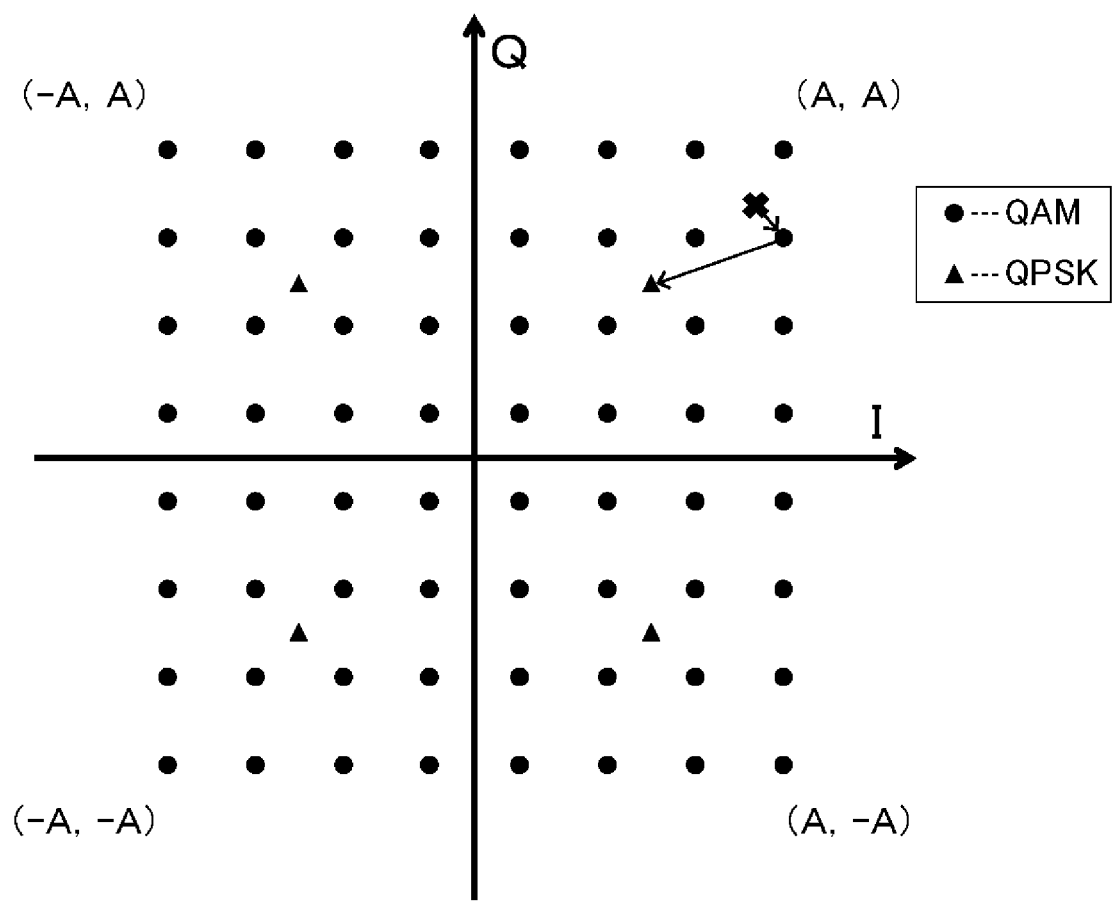
FIG. 5 is a diagram illustrating an example of an operation of a QPSK determination unit.

Reference will be made to FIG. 5 to describe an example of the operation of the second symbol determination unit 522 in a case where the first symbol determination unit 521 is in an ON-state as it is. FIG. 5 shows a case where the QAM signal is a 64-QAM signal. The output of the first symbol determination unit 521 is denoted by marks o on the plane IQ. The second symbol determination unit 522 determines the symbol position of the QPSK signal closest to $d^{QAM}$ using thresholds I=0 and Q=0 as a boundary, and outputs a determination signal represented by the following Expression (9). The determination signal is any one of four symbols denoted by a mark Δ.

$$d^{QPSK} = \pm \frac{4}{7}A \pm j\frac{4}{7}A \qquad (9)$$

Figure 6:
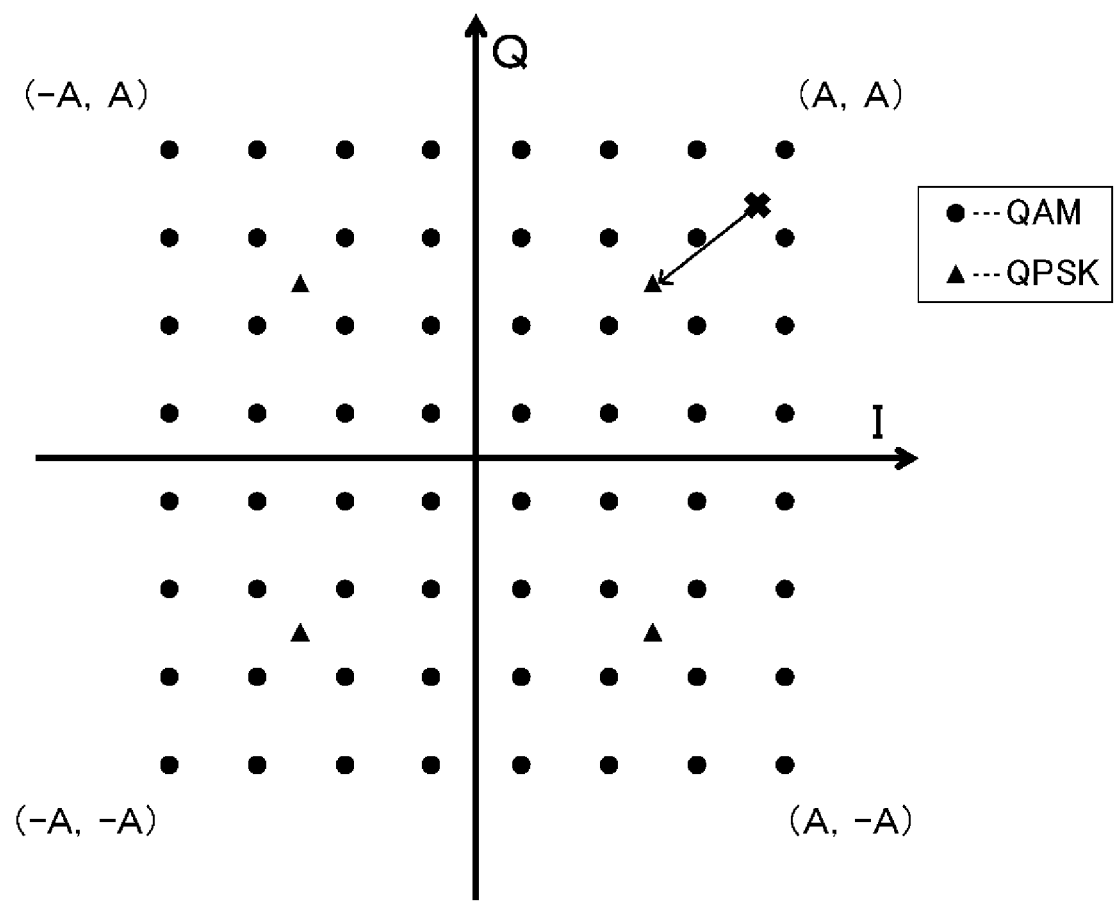
FIG. 6 is a diagram illustrating another example of the operation of the QPSK determination unit.

Next, reference will be made to FIG. 6 to describe the operation of the second symbol determination unit 522 in a case where the control unit 560 sets the first symbol determination unit 521 to be in an OFF-state. FIG. 6 also shows a case where the QAM signal is a 64-QAM signal. The carrier recovery signal is denoted by a mark × on the plane IQ. The second symbol determination unit 522 determines the symbol position of the QPSK signal closest to the carrier recovery signal e'($t_n$) using thresholds I=0 and Q=0 as a boundary, and outputs a determination signal $d^{QPSK}$ represented by Expression (9) stated above. This determination signal is also any one of four symbols denoted by a mark Δ.

The error calculation unit 530 outputs the phase error $\theta_{err}$. The loop filter unit 540 starts a calculation with an initial value of $\omega_0$ as a starting point, and outputs $\omega_e \Delta t$ by estimating the frequency error $\omega_e$. Since the symbol determination unit 520 makes a determination with the QAM signal regarded as the QPSK signal, the allowable range of the frequency error $\omega_e$ is large even in a case of the QAM signal, and the feedback loop converges even in a case of any initial value, whereby it is possible to estimate the temporary value of the frequency error $\omega_e$. In this case, $\omega_e^{QPSK}\Delta t$ is stored in the delay device 545 (step S3).

When the feedback loop converges (step S4), the control unit 560 sets the first symbol determination unit 521 to be in an ON-state in a case where the determination unit is set to be in an OFF-state. In addition, the second symbol determination unit 522 is set to be in an OFF-state, and the coefficients $K_1$ and $K_2$ of the amplifiers 541 and 542 are set to values represented by the following Expression (10) (step S5).

$$K_1 = K_1^{QAM}, K_2 = K_2^{QAM} \qquad (10)$$

When the coefficients of the amplifiers are switched from $K_1^{QPSK}$ to $K_1^{QAM}$ and from $K_2^{QPSK}$ to $K_2^{QAM}$, respectively, the setting values of the coefficients may be gradually transitioned. In addition, regarding the determination of convergence of the feedback loop, an error vector magnitude (EVM) may be calculated, for example, by monitoring the carrier recovery signal, and a bit error rate (BER) may be calculated by demodulating the carrier recovery signal up to binary data.

In a case where the second symbol determination unit 522 is set to in an OFF-state, the first symbol determination unit 521 outputs a determination signal represented by the following Expression (11) as it is.

$$d^{QAM}(t_n) = \frac{2m-1}{7}A + j\frac{2n-1}{7}A (m = -3 \sim 4, n = -3 \sim 4) \qquad (11)$$

The error calculation unit 530 outputs the phase error $\theta_{err}$. The loop filter unit 540 starts a calculation with an initial value of $\omega_e^{QPSK}\Delta t$ as a starting point, and outputs $\omega_e \Delta t$ by estimating the frequency error $\omega_e$.

In a case of the QAM signal, the allowable range of the frequency error $\omega_e$ is small, but the initial value is appropriately set, and thus the feedback loop converges, whereby it is possible to estimate the frequency error $\omega_e$. In this case, the delay device 545 stores $\omega_e^{QAM}\Delta t$ (step S6).

In a case where the feedback loop converges (step S7), the operation is started.

In this manner, in the present example embodiment, it is possible to realize a frequency error estimation in which a frequency pull-in range is large by performing a signal determination in which the number of symbols is reduced, such as, for example, performing a QPSK determination in the QAM signal. As a result, the estimation of a frequency error is also facilitated with an ultrahigh multi-value modulation signal.

Second Example Embodiment

An optical communication system 10 according to the present example embodiment has the same configuration as that of the optical communication system 10 according to the first example embodiment, except for the functional configuration of the carrier recovery unit 500.

Figure 7:
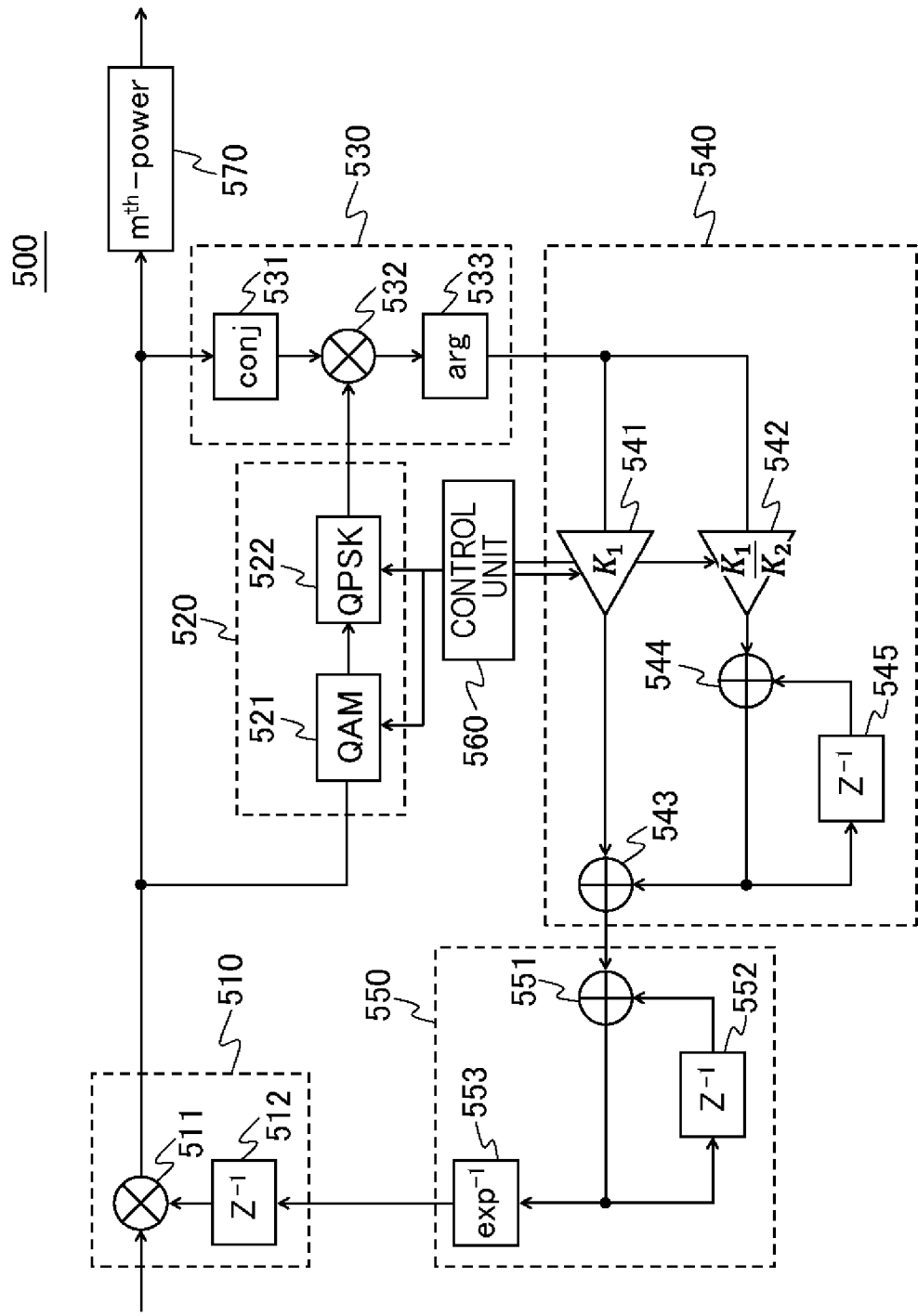
FIG. 7 is a block diagram illustrating a configuration of a carrier recovery unit according to a second example embodiment.

FIG. 7 is a block diagram illustrating a configuration of a carrier recovery unit. The carrier recovery unit 500 according to the present example embodiment has the same configuration as that of the carrier recovery unit 500 shown in the first example embodiment, except for the following points.

The carrier recovery unit 500 includes a phase compensation unit 570 in addition to the configuration shown in FIG. 2. The phase compensation unit 570 further removes a light source frequency error remaining the carrier recovery signal e'($t_n$) using an $m^{th}$-power algorithm, and outputs a carrier recovery signal e''($t_n$). Note that the symbol determination unit 520 and the error calculation unit 530 processes a signal before entering the phase compensation unit 570. In other words, the phase compensation unit 570 is located outside of the feedback loop.

According to the present example embodiment, as is the case with the first example embodiment, it is possible to realize a frequency error estimation in which a frequency pull-in range is larger than in the related art, and to perform a frequency error estimation with an ultrahigh multi-value modulation signal. In addition, since the phase compensation unit 570 is included, it is possible to further reduce a frequency error of a light source.

Third Example Embodiment

An optical communication system 10 according to the present example embodiment has the same configuration as that of the optical communication system 10 according to the second example embodiment, except for the functional configuration of the carrier recovery unit 500.

Figure 8:
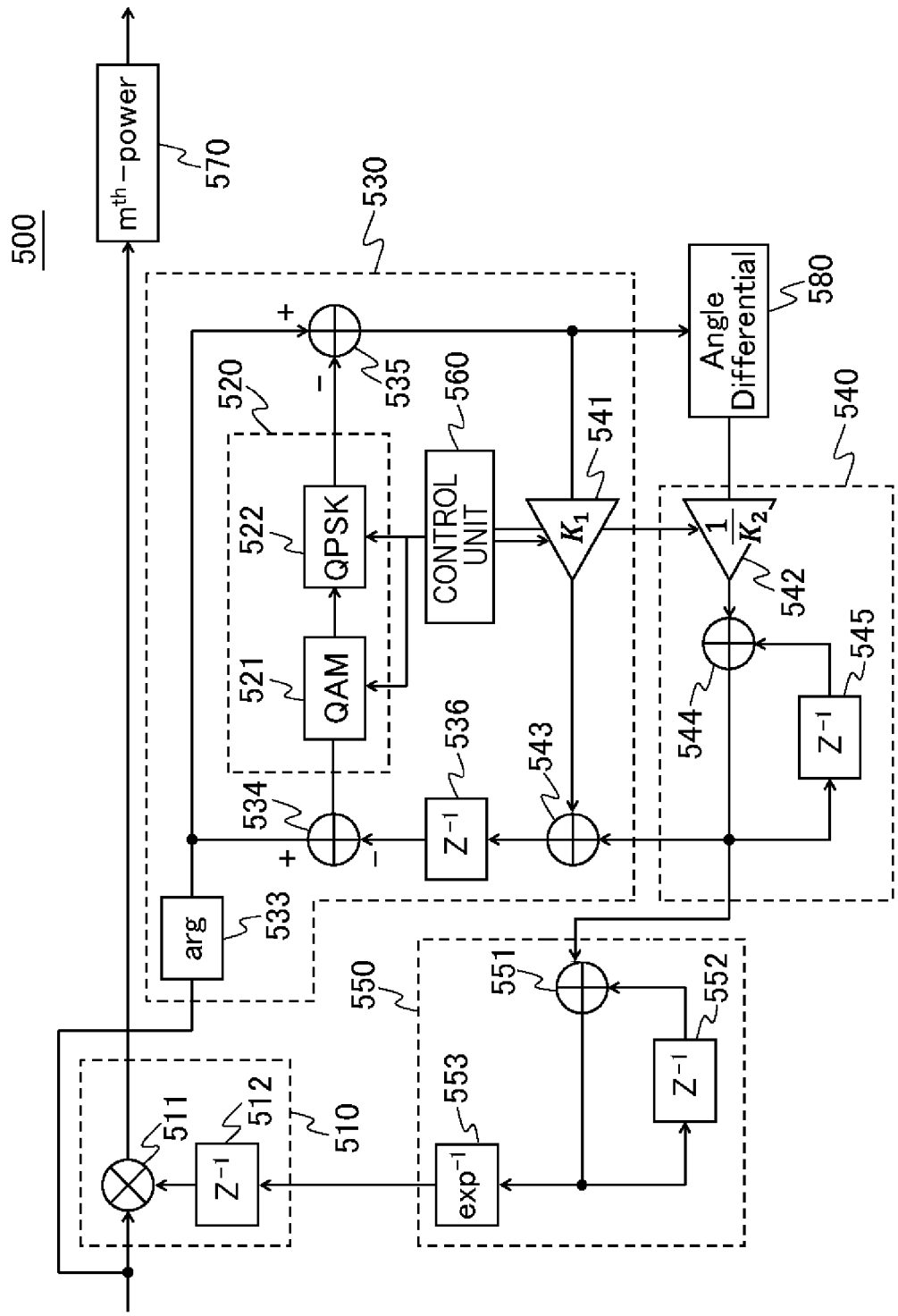
FIG. 8 is a block diagram illustrating a configuration of a carrier recovery unit according to a third example embodiment.

FIG. 8 is a block diagram illustrating a configuration of a carrier recovery unit. The carrier recovery unit 500 according to the present example embodiment has the same configuration as that of the carrier recovery unit 500 shown in the second example embodiment, except for the following points.

The carrier recovery unit 500 includes a differential phase calculation unit 580 in addition to the configuration shown in FIG. 7. In addition, the configurations of the error calculation unit 530 and the loop filter unit 540 are different from those in FIG. 7. In the present example embodiment, the compensation signal generation unit 550 generates a compensation signal using a differential value of a difference in the angle of deviation on the complex representation of the carrier recovery signal.

Specifically, the error calculation unit 530 includes a symbol determination unit 520, and further includes a deviation angle calculator 533, adders 534, 535, and 543, an amplifier 541, and a delay device 536. The error calculation unit 530 calculates and outputs the phase error $\theta_{err}(t_n)$ from the equalized signal $e'(t_n)$.

In particular, the deviation angle calculator 533 calculates the angle of deviation of an equalized signal $e(t_n)$ which is input to the multiplier 511. The output of the deviation angle calculator 533 is output to the adder 534 and the adder 535. The adder 534 adds the output of the deviation angle calculator 533 and that of the delay device 536. The symbol determination unit 520 performs a symbol determination using the output of the adder 534. The adder 535 adds the output of the symbol determination unit 520 and the output of the deviation angle calculator 533. The output of the adder 535 is input to the amplifier 541 and the differential phase calculation unit 580.

The differential phase calculation unit 580 calculates and outputs a differential value of the phase error $\theta_{err}(t_n)$. The output of the differential phase calculation unit 580 is input to the amplifier 542 of the loop filter unit 540.

The loop filter unit 540 is constituted by the amplifier 542, the adder 543 and the delay device 545. The loop filter unit 540 is configured according to a transfer function LF(Z) represented by the following Expression (12), estimates the frequency error $\omega_e$ by averaging phase errors, and outputs $\omega_e \Delta t$.

$$LF(Z) = \frac{1}{K_2} \frac{1}{1 - Z^{-1}} \qquad (12)$$

Note that the output of the amplifier 542 is input to the compensation signal generation unit 550. In addition, the output of the amplifier 542 is also input to the adder 543 as is the case with the second example embodiment. The output of the adder 543 is input to the adder 534 through the delay device 536.

In the present example embodiment, a frequency error estimation in which a frequency pull-in range is larger than in the related art is also realized, and thus a frequency error estimation can be performed even in an ultrahigh multi-value modulation signal.

Fourth Example Embodiment

Figure 9:
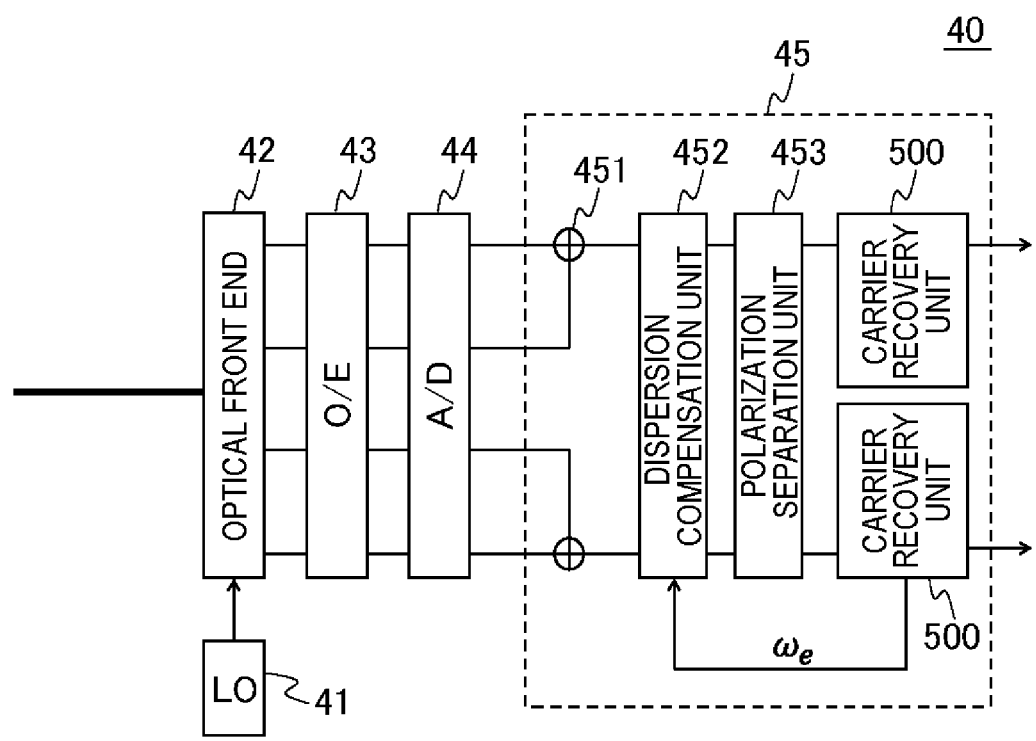
FIG. 9 is a block diagram illustrating a configuration of an optical signal reception apparatus according to a fourth example embodiment.

FIG. 9 is a block diagram illustrating a configuration of an optical signal reception apparatus 40 according to a fourth example embodiment. The optical signal reception apparatus 40 according to the present example embodiment has the same configuration as that of any of the optical signal reception apparatuses 40 shown in the first to third example embodiments, except for the following points.

First, the dispersion compensation unit 452 is constituted by a frequency domain equalization (FDE) circuit. The FDE circuit performs fast Fourier transform (FFT) on a complex signal to convert the transformed signal into a frequency domain signal, performs filter processing, and then performs inverse Fourier transform (IFFT) to return the result to a time domain signal. In this case, frequency shift is performed on the frequency domain signal, and thus it is possible to compensate for a light source frequency error in a frequency domain.

Consequently, the amount of frequency shift is calculated from the frequency error $\omega_e$ estimated in the carrier recovery unit 500, and the light source frequency error is compensated for by FDE.

In this manner, according to the present example embodiment, a static light source frequency error is compensated for by the dispersion compensation unit 452, and a dynamic light source frequency error is compensated for by the carrier recovery unit 500, whereby it is also possible to perform a stable frequency error estimation in an ultrahigh multi-value modulation signal.

Fifth Example Embodiment

Figure 10:
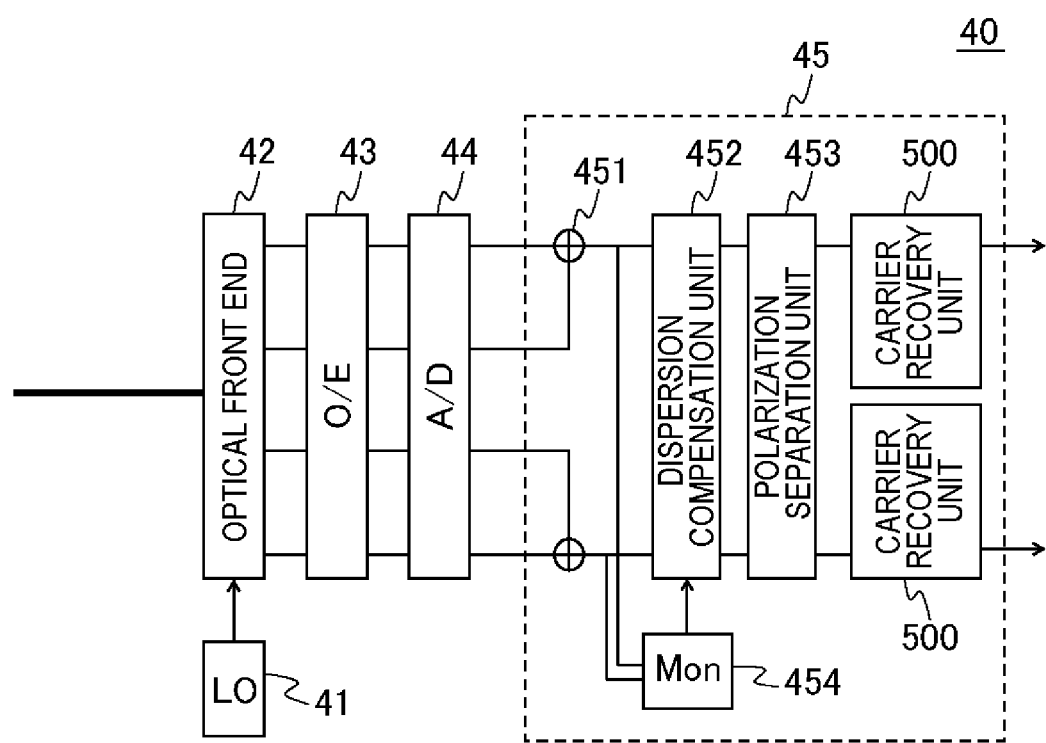
FIG. 10 is a block diagram illustrating a configuration of an optical signal reception apparatus according to a fifth example embodiment.

FIG. 10 is a block diagram illustrating a configuration of an optical signal reception apparatus 40 according to a fifth example embodiment. The optical signal reception apparatus 40 according to the present example embodiment has the same configuration as those of the optical signal reception apparatuses 40 shown in the first to third example embodiments, except for the following points.

The optical signal reception apparatus 40 further includes a light source frequency error monitoring unit 454. The light source frequency error monitoring unit 454 monitors a complex signal with a modulation system-independent system, which makes it possible to perform frequency error monitoring more extensively than the carrier recovery unit 500.

Consequently, the amount of frequency shift is calculated from the frequency error monitored by the light source frequency error monitoring unit 454, and the light source frequency error is compensated for in advance by the FDE of the dispersion compensation unit 452, using this amount of frequency shift.

In this manner, a static and approximate light source frequency error is compensated for by the dispersion compensation unit 452, and a dynamic light source frequency error is compensated for by the carrier recovery unit 500, whereby it is possible to realize a frequency error estimation in which a frequency pull-in range is considerably large, and to perform a stable frequency error estimation in an ultrahigh multi-value modulation signal.

Hereinafter, examples of reference forms are appended.
1. An optical signal reception apparatus including:
an optical front end that generates a plurality of output light beams by causing an optical signal on which polarization multiplexing and multi-value modulation are performed and a local light beam to interfere with each other;
a signal conversion unit that generates a plurality of digital signals by photoelectrically converting and further analog-digital converting each of the plurality of output light beams;
a frequency difference compensation unit that generates a carrier recovery signal by compensating for a frequency difference between the local light beam and the optical signal with respect to the plurality of digital signals;

a first symbol determination unit that determines a symbol position of the carrier recovery signal in accordance with a signal arrangement of the multi-value modulation;

a second symbol determination unit that determines the symbol position of the carrier recovery signal in accordance with a signal arrangement in which the number of multi-values of the multi-value modulation is reduced; and a compensation signal generation unit that generates a compensation signal in the frequency difference compensation unit, wherein the compensation signal generation unit temporarily generates the compensation signal using a determination result of the second symbol determination unit, and then regularly generates the compensation signal using a determination result of the first symbol determination unit.

2. The optical signal reception apparatus according to 1, wherein the signal arrangement of the multi-value modulation is a signal arrangement equal to or more than 16-QAM, and the signal arrangement in which the number of multi-values of the multi-value modulation is reduced is a signal arrangement of QPSK.

3. The optical signal reception apparatus according to 1 or 2, wherein the compensation signal generation unit temporarily generates the compensation signal using a symbol position indicated by the determination result of the second symbol determination unit and a difference in an angle of deviation on a complex representation of the carrier recovery signal.

4. The optical signal reception apparatus according to 3, wherein the compensation signal generation unit regularly generates the compensation signal using a symbol position indicated by the determination result of the first symbol determination unit and a difference in an angle of deviation on a complex representation of the carrier recovery signal.

5. The optical signal reception apparatus according to 1 or 2, wherein the compensation signal generation unit temporarily generates the compensation signal using a symbol position indicated by the determination result of the second symbol determination unit and a differential value of a difference in an angle of deviation on a complex representation of the carrier recovery signal.

6. The optical signal reception apparatus according to 5, wherein the compensation signal generation unit regularly generates the compensation signal using a symbol position indicated by the determination result of the first symbol determination unit and a differential value of a difference in an angle of deviation on a complex representation of the carrier recovery signal.

7. An optical communication system including:

an optical signal transmission apparatus that transmits an optical signal on which polarization multiplexing and multi-value modulation are performed; and an optical signal reception apparatus that processes the optical signal, wherein the optical signal reception apparatus includes an optical front end that generates a plurality of output light beams by causing the optical signal and a local light beam to interfere with each other, a signal conversion unit that generates a plurality of digital signals by photoelectrically converting and further analog-digital converting each of the plurality of output light beams, a frequency difference compensation unit that generates a carrier recovery signal by compensating for a frequency difference between the local light beam and the optical signal with respect to the plurality of digital signals, a first symbol determination unit that determines a symbol position of the carrier recovery signal in accordance with a signal arrangement of the multi-value modulation, a second symbol determination unit that determines the symbol position of the carrier recovery signal in accordance with a signal arrangement in which the number of multi-values of the multi-value modulation is reduced, and a compensation signal generation unit that generates a compensation signal in the frequency difference compensation unit, and the compensation signal generation unit temporarily generates the compensation signal using a determination result of the second symbol determination unit, and then regularly generates the compensation signal using a determination result of the first symbol determination unit.

8. The optical communication system according to 7, wherein the signal arrangement of the multi-value modulation is a signal arrangement equal to or more than 16-QAM, and the signal arrangement in which the number of multi-values of the multi-value modulation is reduced is a signal arrangement of QPSK.

9. The optical communication system according to 7 or 8, wherein the compensation signal generation unit temporarily generates the compensation signal using a symbol position indicated by the determination result of the second symbol determination unit and a difference in an angle of deviation on a complex representation of the carrier recovery signal.

10. The optical communication system according to 9, wherein the compensation signal generation unit regularly generates the compensation signal using a symbol position indicated by the determination result of the first symbol determination unit and a difference in an angle of deviation on a complex representation of the carrier recovery signal.

11. The optical communication system according to 7 or 8, wherein the compensation signal generation unit temporarily generates the compensation signal using a symbol position indicated by the determination result of the second symbol determination unit and a differential value of a difference in an angle of deviation on a complex representation of the carrier recovery signal.

12. The optical communication system according to 11, wherein the compensation signal generation unit regularly generates the compensation signal using a symbol position indicated by the determination result of the first symbol determination unit and a differential value of a difference in an angle of deviation on a complex representation of the carrier recovery signal.

13. A method of generating a compensation signal of an optical signal reception apparatus in a frequency difference compensation unit, the optical signal reception apparatus including:

an optical front end that generates a plurality of output light beams by causing an optical signal on which polarization multiplexing and multi-value modulation are performed and a local light beam to interfere with each other;

a signal conversion unit that generates a plurality of digital signals by photoelectrically converting and further analog-digital converting each of the plurality of output light beams;

a frequency difference compensation unit that generates a carrier recovery signal by compensating for a frequency difference between the local light beam and the optical signal with respect to the plurality of digital signals;

a first symbol determination unit that determines a symbol position of the carrier recovery signal in accordance with a signal arrangement of the multi-value modulation; and a second symbol determination unit that determines the symbol position of the carrier recovery signal in accordance with a signal arrangement in which the number of multi-values of the multi-value modulation is reduced, wherein the method includes temporarily generating the compensation signal using a determination result of the second symbol determination unit, and then regularly generating the compensation signal using a determination result of the first symbol determination unit.

14. The method of generating a compensation signal of an optical signal reception apparatus according to 13, wherein the signal arrangement of the multi-value modulation is a signal arrangement equal to or more than 16-QAM, and the signal arrangement in which the number of multi-values of the multi-value modulation is reduced is a signal arrangement of QPSK.

15. The method of generating a compensation signal of an optical signal reception apparatus according to 13 or 14, further including temporarily generating the compensation signal using a symbol position indicated by the determination result of the second symbol determination unit and a difference in an angle of deviation on a complex representation of the carrier recovery signal.

16. The method of generating a compensation signal of an optical signal reception apparatus according to 15, further including regularly generating the compensation signal using a symbol position indicated by the determination result of the first symbol determination unit and a difference in an angle of deviation on a complex representation of the carrier recovery signal.

17. The method of generating a compensation signal of an optical signal reception apparatus according to 13 or 14, further including temporarily generating the compensation signal using a symbol position indicated by the determination result of the second symbol determination unit and a differential value of a difference in an angle of deviation on a complex representation of the carrier recovery signal.

18. The method of generating a compensation signal of an optical signal reception apparatus according to 17, further including regularly generating the compensation signal using a symbol position indicated by the determination result of the first symbol determination unit and a differential value of a difference in an angle of deviation on a complex representation of the carrier recovery signal.

As described above, although the example embodiments of the present invention have been set forth with reference to the accompanying drawings, the embodiments are merely illustrative of the present invention, and various configurations other than those stated above can be adopted.

This application claims priority from Japanese Patent Application No. 2016-068282 filed on Mar. 30, 2016, the content of which is incorporated herein by reference in its entirety.

The invention claimed is:
1. An optical signal reception apparatus comprising:
an optical front end configured to generate a plurality of output light beams by causing an optical signal on which polarization multiplexing and multi-value modulation are performed and a local light beam to interfere with each other;

a signal conversion unit configured to generate a plurality of digital signals by photoelectrically converting and further analog-digital converting each of the plurality of output light beams;

a frequency difference compensation unit configured to generate a carrier recovery signal by compensating for a frequency difference between the local light beam and the optical signal with respect to the plurality of digital signals;

a first symbol determination unit configured to determine a symbol position of the carrier recovery signal in accordance with a signal arrangement of the multi-value modulation;

a second symbol determination unit configured to determine the symbol position of the carrier recovery signal in accordance with a signal arrangement in which the number of multi-values of the multi-value modulation is reduced; and a compensation signal generation unit configured to generate a compensation signal in the frequency difference compensation unit, wherein the compensation signal generation unit is configured to temporarily generate the compensation signal using a determination result of the second symbol determination unit, and then to regularly generate the compensation signal using a determination result of the first symbol determination unit, and wherein the compensation signal generation unit is configured to temporarily generate the compensation signal using a symbol position indicated by the determination result of the second symbol determination unit and a differential value of a difference in an angle of deviation on a complex representation of the carrier recovery signal.

2. The optical signal reception apparatus according to claim 1,
wherein the signal arrangement of the multi-value modulation is a signal arrangement equal to or more than 16-QAM, and
wherein the signal arrangement in which the number of multi-values of the multi-value modulation is reduced is a signal arrangement of QPSK.

3. The optical signal reception apparatus according to claim 1,
wherein the compensation signal generation unit is configured to regularly generate the compensation signal using a symbol position indicated by the determination result of the first symbol determination unit and a difference in an angle of deviation on a complex representation of the carrier recovery signal.

4. An optical communication system comprising:
an optical signal transmission apparatus configured to transmit an optical signal on which polarization multiplexing and multi-value modulation are performed; and
an optical signal reception apparatus configured to process the optical signal,
wherein the optical signal reception apparatus includes:
an optical front end configured to generate a plurality of output light beams by causing the optical signal and a local light beam to interfere with each other;

a signal conversion unit configured to generate a plurality of digital signals by photoelectrically converting and further analog-digital converting each of the plurality of output light beams;

a frequency difference compensation unit configured to generate a carrier recovery signal by compensating for a frequency difference between the local light beam and the optical signal with respect to the plurality of digital signals;

a first symbol determination unit configured to determine a symbol position of the carrier recovery signal in accordance with a signal arrangement of the multi-value modulation;

a second symbol determination unit configured to determine the symbol position of the carrier recovery signal in accordance with a signal arrangement in which the number of multi-values of the multi-value modulation is reduced; and a compensation signal generation unit configured to generate a compensation signal in the frequency difference compensation unit, wherein the compensation signal generation unit is configured to temporarily generate the compensation signal using a determination result of the second symbol determination unit, and then to regularly generate the compensation signal using a determination result of the first symbol determination unit, and wherein the compensation signal generation unit is configured to temporarily generate the compensation signal using a symbol position indicated by the determination result of the second symbol determination unit and a differential value of a difference in an angle of deviation on a complex representation of the carrier recovery signal.

5. The optical communication system according to claim 4, wherein the signal arrangement of the multi-value modulation is a signal arrangement equal to or more than 16-QAM, and wherein the signal arrangement in which the number of multi-values of the multi-value modulation is reduced is a signal arrangement of QPSK.

6. The optical communication system according to claim 4, wherein the compensation signal generation unit is configured to regularly generate the compensation signal using a symbol position indicated by the determination result of the first symbol determination unit and a difference in an angle of deviation on a complex representation of the carrier recovery signal.

7. A method of generating a compensation signal of an optical signal reception apparatus in a frequency difference compensation unit, the optical signal reception apparatus including an optical front end, a signal conversion unit, a frequency, difference compensation unit, a first symbol determination unit, a second symbol determination unit and a compensation signal generation unit, wherein the method comprises:

generating, by the optical front end, a plurality of output light beams by causing an optical signal on which polarization multiplexing and multi-value modulation are performed and a local light beam to interfere with each other;

generating, by the signal conversion unit, a plurality of digital signals by photoelectrically converting and further analog-digital converting each of the plurality of output light beams;

generating, by the frequency difference compensation unit, a carrier recovery signal by compensating for a frequency difference between the local light beam and the optical signal with respect to the plurality of digital signals;

determining, by the first symbol determination unit a symbol position of the carrier recovery signal in accordance with a signal arrangement of the multi-value modulation;

determining, by the second symbol determination unit, the symbol position of the carrier recovery signal in accordance with a signal arrangement in which the number of multi-values of the multi-value modulation is reduced;

temporarily generating, by the compensation signal generation unit, the compensation signal using a determination result of the second symbol determination unit, and then regularly generating the compensation signal using a determination result of the first symbol determination unit; and temporarily generating, by the compensation signal generation unit, the compensation signal using a symbol position indicated by the determination result of the second symbol determination unit and a differential value of a difference in an angle of deviation on a complex representation of the carrier recovery signal.

8. The method according to claim 7, wherein the signal arrangement of the multi-value modulation is a signal arrangement equal to or more than 16-QAM, and wherein the signal arrangement in which the number of multi-values of the multi-value modulation is reduced is a signal arrangement of QPSK.

9. The method of claim 7, wherein the method further comprises regularly generating, by the compensation signal generation unit, the compensation signal using a symbol position indicated by the determination result of the first symbol determination unit and a difference in an angle of deviation on a complex representation of the carrier recovery signal.

* * * * *

UNITED STATES PATENT AND TRADEMARK OFFICE
CERTIFICATE OF CORRECTION

PATENT NO. : 10,530,489 B2  Page 1 of 1
APPLICATION NO. : 16/089180
DATED : January 7, 2020
INVENTOR(S) : Wakako Yasuda It is certified that error appears in the above-identified patent and that said Letters Patent is hereby corrected as shown below:

In the Specification

Column 6, Description of Embodiments, Line 56; Delete "w" and insert --$\omega$-- therefor Column 7, Description of Embodiments, Line 22; Delete "e($t_n$)" and insert --e'($t_n$)-- therefor Column 8, Description of Embodiments, Line 26; Delete "w" and insert --$\omega$-- therefor In the Claims Column 18, Line 1; In Claim 7, delete "frequency," and insert --frequency-- therefor Signed and Sealed this
Fifth Day of May, 2020

Andrei Iancu
*Director of the United States Patent and Trademark Office*